US012809282B2

(12) United States Patent
Ruberu et al.

(10) Patent No.: US 12,809,282 B2
(45) Date of Patent: Nov. 24, 2026

(54) SUBMICRON SURFACE-MODIFIED METAL OXIDE PARTICLES

(71) Applicants: Evonik Operations GmbH, Essen (DE); Evonik Corporation, Piscataway, NJ (US)

(72) Inventors: Thanthirige Purnima A Ruberu, Allentown, PA (US); Megha Sharma, Newark, DE (US); Helmut Mack, Traunstein (DE); Abul Bashar Mohammad Giasuddin, Allentown, PA (US)

(73) Assignees: Evonik Operations GmbH, Essen (DE); Evonik Corporation, Piscataway, NJ (US)

( * ) Notice: Subject to any disclaimer, the term of this patent is extended or adjusted under 35 U.S.C. 154(b) by 446 days.

(21) Appl. No.: 18/694,149

(22) PCT Filed: Sep. 19, 2022

(86) PCT No.: PCT/EP2022/075924
§ 371 (c)(1),
(2) Date: Mar. 21, 2024

(87) PCT Pub. No.: WO2023/046624
PCT Pub. Date: Mar. 30, 2023

(65) Prior Publication Data

US 2025/0138444 A1 May 1, 2025

(30) Foreign Application Priority Data

Sep. 24, 2021 (EP) .................................... 21198745

(51) Int. Cl.
*G03G 9/093* (2006.01)
*G03G 9/08* (2006.01)

(52) U.S. Cl.
CPC ....... *G03G 9/09335* (2013.01); *G03G 9/0802* (2013.01); *G03G 9/09342* (2013.01)

(58) Field of Classification Search
CPC .. C09C 1/3684; C01B 33/18; G03G 9/09342; G03G 9/0802; G03G 9/09335
See application file for complete search history.

(56) References Cited

U.S. PATENT DOCUMENTS

| | | | |
|---|---|---|---|
| 5,013,585 | A | 5/1991 | Shimizu et al. |
| 7,083,688 | B2 | 8/2006 | Kudo et al. |

(Continued)

FOREIGN PATENT DOCUMENTS

| | | |
|---|---|---|
| CN | 110272641 | 3/2020 |
| DE | 10 2006 033 136 | 1/2008 |

(Continued)

OTHER PUBLICATIONS

CoatOSil MP 200 technical data sheet, Momentive. file:///C:/Users/pvajda/Downloads/coatosil-mp-200-mb.pdf. Copyright 2017-2018.*

(Continued)

*Primary Examiner* — Peter L Vajda
(74) *Attorney, Agent, or Firm* — Grüneberg Global IP, PLLC

(57) ABSTRACT

A surface-modified particle includes a core containing at least one oxidic material and at least one layer. The layer is obtained from at least one silicon compound and at least one silane according to formula(S). The silicon compound includes at least one building block of formula (A) and at least one building block of formula (B). A method is developed for preparing the surface-modified particle, and another method treats a surface of a substrate with at least (Continued)

one surface-modified particle. The surface-modified particle is added to various formulations, in particular a toner composition.

20 Claims, 2 Drawing Sheets

(56) References Cited

U.S. PATENT DOCUMENTS

| | | | | |
|---|---|---|---|---|
| 7,264,787 | B2 | 9/2007 | Katusic et al. | |
| 7,972,431 | B2 | 7/2011 | Meyer et al. | |
| 7,981,211 | B2 | 7/2011 | Meyer et al. | |
| 8,507,033 | B2 | 8/2013 | Meyer et al. | |
| 8,722,838 | B2 | 5/2014 | Scholz et al. | |
| 8,895,145 | B2 | 11/2014 | Christopher et al. | |
| 9,212,193 | B2 | 12/2015 | Bekiarian et al. | |
| 10,222,717 | B2 | 3/2019 | Kaneeda et al. | |
| 2004/0102529 | A1 | 5/2004 | Campbell et al. | |
| 2005/0036928 | A1 | 2/2005 | Katusic et al. | |
| 2008/0069753 | A1 | 3/2008 | Floess et al. | |
| 2008/0070143 | A1 | 3/2008 | Fomitchev et al. | |
| 2009/0258968 | A1 | 10/2009 | Meyer et al. | |
| 2009/0292097 | A1 | 11/2009 | Scholz et al. | |
| 2010/0022694 | A1 | 1/2010 | Meyer et al. | |
| 2010/0102268 | A1 | 4/2010 | Kroell et al. | |
| 2010/0196243 | A1 | 8/2010 | Meyer et al. | |
| 2010/0233059 | A1 | 9/2010 | Meyer et al. | |
| 2010/0307068 | A1 | 12/2010 | Kroell | |
| 2011/0195099 | A1 | 8/2011 | Nolte et al. | |
| 2012/0083188 | A1 | 4/2012 | Kroell et al. | |
| 2014/0102334 | A1 | 4/2014 | Scholz et al. | |
| 2018/0112077 | A1* | 4/2018 | Ranganathan | C09D 5/00 |
| 2019/0121252 | A1 | 4/2019 | Komada | |
| 2019/0375643 | A1 | 12/2019 | Li et al. | |

FOREIGN PATENT DOCUMENTS

| | | |
|---|---|---|
| EP | 0 675 128 | 10/1995 |
| EP | 3 178 887 | 6/2018 |
| JP | 2011-47988 A | 3/2011 |
| JP | 2019-43829 | 3/2019 |
| JP | 2019-78802 A | 5/2019 |
| KR | 10-2011-0003544 A | 1/2011 |
| WO | 2010/005492 | 1/2010 |
| WO | 2021/036972 A1 | 3/2021 |

OTHER PUBLICATIONS

An et al., "Preparation and self-assembly of carboxylic acid-functionalized silica". Journal of Colloid and Interface Science, vol. 311, available online Mar. 3, 2007, pp. 507-513.

European Search Report received for European Patent Application No. 21198745.8, dated Mar. 3, 2022, 6 pages.

Hartono et al., "Improving Adsorbent Properties of Cage-like Ordered Amine Functionalized Mesoporous Silica with Very Large Pores for Bioadsorption", *Langmuir*, vol. 25, No. 11, Mar. 3, 2009, pp. 6413-6424.

International Search Report received for PCT Application No. PCT/EP2022/075924, dated Dec. 5, 2022, 6 pages.

Joseph et al., "Syndiotactic Polystyrene/Hybrid Silica Spheres of POSS Siloxane Composites Exhibiting Ultralow Dielectric Constant", ACS Applied Materials & Interfaces, vol. 7, No. 34, Sep. 2, 2015, pp. 19474-19483.

Stöber et al., "Controlled Growth of Monodisperse Silica Spheres in the Micron Size Range", Journal of Colloid And Interface Science, vol. 26, Jan. 1968, pp. 62-69.

Written Opinion received for PCT Application No. PCT/EP2022/075924, dated Dec. 5, 2022, 7 pages.

U.S. Appl. No. 14/138,568, filed Dec. 23, 2013, 2014/0102334, Scholz et al.

U.S. Appl. No. 12/526,523, filed Aug. 10, 2009, 2010/0102268, Kroell et al.

U.S. Appl. No. 12/670,130, filed Jan. 22, 2010, 2010/0196243, Meyer et al.

U.S. Appl. No. 12/745,598, filed Jun. 1, 2010, 2010/0307068, Michael Kroell.

U.S. Appl. No. 13/377,005, filed Dec. 8, 2011, 2012/0083188, Kroell et al.

U.S. Appl. No. 63/169,367, filed Apr. 1, 2021, Ruberu et al.

* cited by examiner

SUBMICRON SURFACE-MODIFIED METAL OXIDE PARTICLES

CROSS-REFERENCE TO RELATED APPLICATIONS

This application is a National Stage entry under § 371 of International Application No. PCT/EP2022/075924, filed on Sep. 19, 2022, and which claims the benefit of priority to European Patent Application No. 21198745.8, filed on Sep. 24, 2021. The content of each of these applications is hereby incorporated by reference in its entirety.

The present invention relates to a surface-modified particle for use in a toner composition, a method of preparing the surface-modified particle according to the invention, a method for treating a surface of a substrate with at least one particle according to the invention, a substrate having a treated surface with at least one particle according to the invention, use of the at least one surface-modified particle according to the invention as additive in various formulations and in particular a toner composition comprising the surface-modified particle according to the invention.

BACKGROUND OF THE INVENTION

Field of the Invention

Submicron particles made of metal oxides are well-known in the art and many methods for their making have been published. The usefulness of such particles predominantly depends on their surface and thus, many attempts have been made to alter the properties of such particles by surficial modification thereof. Exemplarily, surface functionalization of colloidal silica with different functional groups is beneficial for diverse applications. The silica surface can be made hydrophobic using silicone oils (JP S49-042354A), hydrosiloxanes (U.S. Pat. No. 8,895,145), trialkoxysilanes (US 2008/0069753, US 2008/0070143, WO 2010/005492, U.S. Pat. No. 10,222,717) and silazanes (U.S. Pat. No. 7,083,888, US 2008/0070143, JP 2019-043829, EP 3,178, 887, U.S. Pat. Nos. 10,222,717, 5,013,585). The surface treatment using silazanes such as hexamethyldisilazane as disclosed in U.S. Pat. No. 7,083,888 has been particularly of interest due to its small size, ability to react in aqueous media and to impart excellent hydrophobicity. This patent describes an approach for silica surface functionalization using monomeric alkoxysilane, e.g. methyltrimethoxysilane (MTMS) and silazane, e.g. hexamethyldisilizane (HMDS), for toner additives. In this process, MTMS and HMDS are sequentially added to the silica suspension in liquid phase with intermediate distillation and solvent exchange steps. A significant downturn of approaches using silazanes is the toxicity of these compounds and the drastic safety measures that are to be implemented when handling these compounds-especially when they are used in large quantities.

DESCRIPTION OF RELATED ART

Hydrosiloxanes as described in U.S. Pat. No. 8,895,145 bind onto the particles upon liberating hydrogen. This, again, requires severe safety measures to be implemented including the necessity to working under inert conditions to avoid potential ignition or explosion hazards. The reaction of the hydrosiloxane and the particles further needs elevated temperatures resulting in high energy consumption.

A more benign method of surface functionalization of metal oxide submicron particles employs monomeric silanes. Amine functionalization can be performed using trialkoxysilanes (U.S. Pat. No. 9,212,193, Hartono et al., Langmuir, 2009, 25, 6413; An et al., JCIS, 2007, 507) for applications which may require enhanced hydrophilicity, molecular adsorption, compatibility with polymers etc. Other functionalities such as epoxy (US 2004/0102529), polyether (US 2019/0375643), acrylate, thiols and sulphates can also be introduced using alkoxysilanes. However, these procedures often result in uneven surface coverage. In addition, the procedures proposed may require high temperatures and the necessity of solvent exchange steps. They also result in the liberation of high amounts of volatile organic compounds (VOC) which is undesired from an ecological standpoint.

CN 110272641 reports pearlescent pigments that can be coated with various silicon-based compounds.

US 2018/112077 discloses a coating composition comprising a silicate binder, a filler, a crosslinking agent and a film forming lubricant. Optionally, silane adhesion promotors are added to the composition.

In addition, it is desirable to provide a surface modification process that is environmentally sustainable. This can be exemplarily achieved reducing the energy consumption during the process, e.g. by using lower temperatures, use of non-toxic surface functionalization agents, less amount of solvents and minimizing the release of volatile organic compounds (VOCs) and toxic biproducts.

It is therefore the objective of the present invention to overcome the shortcomings of the prior art. It is a further objective of the present invention to provide surface-modified particles having an enhanced dispersibility.

SUMMARY OF THE INVENTION

These objectives are solved by the (at least one) surface-modified particle for use in a toner composition comprising a) a core comprising at least one oxidic material selected from the group consisting of silicon oxide, metal oxide and mixtures of one or more of the aforementioned; and b) at least one layer obtained from b.i) at least one silicon compound comprising at least one building block according to formula (A):

(A)

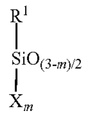

wherein $R^1$ is an organic radical, preferably selected from the group consisting of substituted or non-substituted alkyl group, substituted or non-substituted alkenyl group and substituted or non-substituted aryl group;

each X is independently selected from the group consisting of hydroxy group, carboxylic acid group, chloride and alkoxy group;

m is selected from 0, 1 and 2;

and at least one building block according to formula (B):

(B)

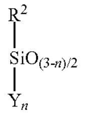

wherein $R^2$ is an organic radical, preferably selected from the group consisting of substituted or non-substituted alkyl group, substituted or non-substituted alkenyl group and substituted or non-substituted aryl group;

each Y is independently selected from the group consisting of hydroxy group, carboxylic acid group, chloride and alkoxy group;

n is selected from 0, 1 and 2; and b.ii) at least one silane according to formula(S):

(S)

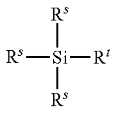

wherein each $R^s$ is independently selected from the group consisting of hydroxy group, carboxylic acid group, chloride, alkoxy group, alkyl group and aryl group; and $R^t$ is selected from the group consisting of alkyl group and alkenyl group;

with the proviso that at least one $R^s$ is selected from the group consisting of chloride, carboxylic acid group, hydroxy group and alkoxy group.

The surface-modified particle according to the invention allows for an improved coverage of the binding sites of the non-modified particle compared to particles of the prior art. In the context of the present invention, an improved coverage means that a higher proportion of binding sites (such as hydroxy groups and/or silanol groups on the surface of the core) is used to bind the layer on the surface of the core obtained from treating said core with at least one silicon compound compared to particles having been made by prior art processes (e.g. with monomeric or long carbon chain silanes or polymers). This improved coverage is normally accompanied by a more uniform statistical distribution of the functionalities present. The improved coverage of binding sites can result in a number of advantageous effects (also dependent on the selection of the building blocks according to formulae (A) and (B)):

an increased crosslinking of the surface-modified particles with polymers and resins, a higher number of coordination sites per area, increased wettability, increased hydrophobicity or decreased moisture absorption.

The surface-modified particle according to the invention possesses enhanced dispersibility properties compared to other particles such as those known from the prior art. The manufacturing of the surface-modified particle according to the invention is environmentally friendly as less or no VOCs or toxic/explosives (for example ammonia or hydrogen) are liberated during their manufacturing and no toxic substances have to be used for this purpose. In addition, lack of ammonia as a byproduct results in a safer process.

The surface-modified particle can be tailored to meet various technical requirements such as hydrophobicity. It is therefore very versatile and useful for many technical applications.

Preferred embodiments solving above described objections particularly well are described in the following description.

DETAILED DESCRIPTION OF THE INVENTION

Figure 1A:
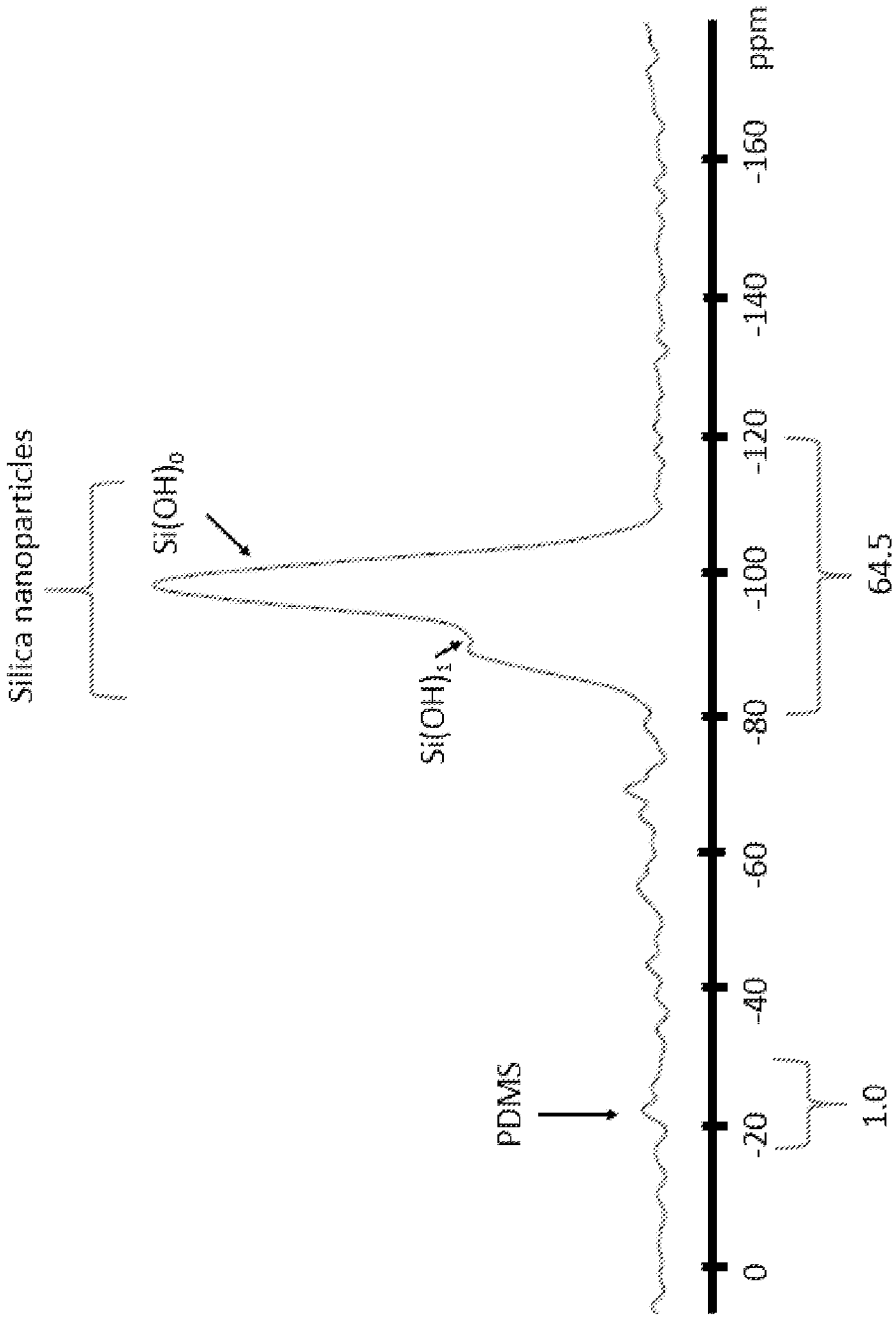
FIG. 1 shows solid state $^{29}$Si NMR spectra of a suspension comprising the surface-modified particles according to the invention (FIG. 1*a*) and of a suspension comprising non-modified particles (FIG. 1*b*), respectively.

Percentages throughout this specification are weight-percentages (wt.-% or weight-%) unless stated otherwise. Concentrations given in this specification refer to the volume of the entire compositions, solutions or dispersions unless stated otherwise.

The term "organic radical" according to the present invention includes inter alia alkyl groups, aryl groups and combinations of the aforementioned. Said groups can be substituted or non-substituted.

The term "alkyl" according to the present invention comprises branched or unbranched alkyl groups comprising cyclic and/or non-cyclic structural elements, wherein cyclic structural elements of the alkyl groups naturally require at least three carbon atoms. C1-CX-alkyl in this specification and as described herein refers to alkyl groups having 1 to X carbon atoms (X being an integer). C1-C8-alkyl for example includes, among others, methyl, ethyl, n-propyl, iso-propyl, n-butyl, isobutyl, sec-butyl, tert-butyl, n-pentyl, iso-pentyl, sec-pentyl, tert-pentyl, neo-pentyl, hexyl, heptyl, 2-ethyl hexyl, iso-octyl and n-octyl. Substituted alkyl groups may theoretically be obtained by replacing at least one hydrogen by a functional group. Unless stated otherwise, alkyl groups are preferably selected from substituted or non-substituted C1-C8-alkyl, more preferably from substituted or non-substituted C1-C4-alkyl.

The "alkenyl group" is an unsaturated derivative of an alkyl group comprising at least one olefinic (C═C-double) bond. Above-described preferences for the alkyl groups apply for alkenyl groups *mutatis mutandis*. Preferable alkenyl groups in the context of the present invention are vinyl group and allyl group unless stated differently hereinafter.

The term "aryl" according to the invention refers to ring-shaped aromatic hydrocarbon residues, for example phenyl or naphthyl where individual ring carbon atoms are optionally replaced by N, O and/or S, for example benzothiazolyl. Preferably, no carbon atoms are substituted. Furthermore, aryl groups are optionally substituted by replacing a hydrogen atom in each case by a functional group. The term C5-CX-aryl refers to aryl groups having 5 to X carbon atoms (optionally replaced by N, O and/or S) in the ring-shaped aromatic group (X naturally being an integer). C5-C6-aryl is preferred unless stated otherwise.

The carboxylic acid group according to the invention refers to a

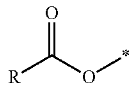

group in which R is a organic radical. R is preferably an unsubstituted or substituted alkyl group, more preferably an unsubstituted or substituted C1-C4-alkyl group unless stated differently hereinafter. In this context, the functional group preferably is a hydroxyl group. Most preferably, the carboxylic acid group is a lactic acid group

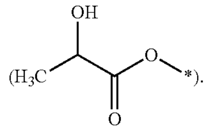

Unless stated otherwise, above-described groups are substituted or non-substituted. Unless stated differently hereinafter, functional groups as substituents are preferably selected from the group consisting of hydroxyl group (—OH), amino group (—$NR_2$ with each R being independently H, an alkyl group (optionally substituted) or an aryl group), ether group (—OR with R being an alkyl group or an aryl group or a lactate group) and carboxyl group (—$CO_2H$) or salts thereof unless stated differently hereinafter. Preferably, above-described groups are non-substituted.

If more than one residue is to be selected from a given group, each of the residues are selected independently from each other unless stated otherwise hereinafter, meaning they can be selected to be the same members or different members of said group. Methods described herein comprise the named method steps. The named method steps are typically carried out in the given order unless stated otherwise. The methods optionally comprise further method steps to be carried out before, after and/or between said method steps. Preferences and details described for one aspect of the present invention apply *mutatis mutandis* to the other aspects thereof unless stated otherwise or technically unfeasible. At least one means one or more than one.

The present invention concerns at least one surface-modified particle (or a plurality thereof). The surface-modified particle according to the invention comprises or preferably consists of a) the core and
b) the at least one layer obtained (or obtainable) from treating said core with the at least one silicon compound comprising at least one building block according to formula (A) and at least one building block according to formula (B) and the at least one silane according to formula(S). Said silicon compound will be referred to hereinafter as "silicon compound".

The surface-modified particle optionally comprises one or more than one further layers between a) and b) and/or on b). Preferably, the surface-modified particle comprises no further layers and particularly preferably, the surface-modified particle according to the invention consists of a) and b). Preferably, the present invention concerns a plurality of surface-modified particles according to the invention.

The core comprises the at least one oxidic material selected from the group consisting of silicon oxide, metal oxide and mixtures of the aforementioned. The at least one oxidic material is preferably selected from the group consisting of silicon oxide, titanium oxide, zirconium oxide, cerium oxide, aluminum oxide, zinc oxide, molybdenum oxide and mixtures of the aforementioned. The oxidic material is most preferably silicon oxide.

Optionally, the core comprises the at least one oxidic material and at least one material other than the at least one oxidic material. The at least one material other than the at least one oxidic material is preferably not an oxidic material. Preferably, the at least one material other than the at least one oxidic material is not glass, mica, kaolin and ceramics. It is preferred that the at least one material other than the at least one oxidic material is at least one polymeric material (thus obtained from organic monomers). The at least one polymeric material is preferably selected from the group consisting of thermosetting polymers, thermoplastic polymers and mixtures of the aforementioned. The at least one polymeric material is more preferably polystyrene. It is preferred that the at least one material other than the at least one oxidic material forms the inner part of the core with the oxidic material covering said inner part, ideally in its entirety. Hence, the surface of the core is thus preferably (made of) the at least one oxidic material. More preferably, the core of the surface-modified particle according to the invention comprises at least 80 weight-%, even more preferably at least 90 weight-%, oxidic material. Most preferably, the core consists of the at least one oxidic material.

The surface-modified particle comprises the at least one layer obtained from treating the core with the at least one silicon compound and the at least one silane according to formula(S). The silicon compound comprises the at least one building block according to formula (A) and (B). The at least one building blocks according to formulae (A) and (B) preferably account (in total) for at least 50 weight-%, more preferably 75 weight-%, even more preferably at least 90 weight-%, based on the total weight of the silicon compound. Ideally, the silicon compound consists of the building blocks according to formulae (A) and (B). The at least one silicon compound is preferably free of trialkyl silyl groups (e.g. $Me_3Si$—) and/or dialkyl silyl (e.g. —$Si(Me)_2$-) groups.

$R^1$ is an organic radical. $R^1$ is preferably selected from the group consisting of substituted or non-substituted alkyl group, substituted or non-substituted alkenyl group (preferably selected from vinyl and allyl) and substituted or non-substituted aryl group. More preferably, $R^1$ is a substituted or non-substituted alkyl group. Even more preferably, $R^1$ is a non-substituted alkyl group. Said alkyl group is preferably a C1-C18-alkyl group, more preferably a C2-C8-alkyl group, even more preferably a C2-C4-alkyl group, especially a propyl group. It is especially preferred that $R^1$ is a non-substituted C2-C4-alkyl group, most preferably a non-substituted propyl group. The functional groups as substituents are preferably selected from the group consisting of amino group (primary or secondary), methacrylate group, acrylate group, epoxy group, anhydride group, vinyl group, alkyl group, polyether group and fluorinated alkyl.

X is preferably selected from the group consisting of hydroxy group and C1-C4-alkoxy group, more preferably selected from the group consisting of hydroxy group, methoxy group and ethoxy group. This preference allows an improved coverage of the binding sites and the avoidance of potentially corrosive halides or hydrogen halides such as HCl.

$R^2$ is an organic radical. $R^2$ is preferably selected from the group consisting of substituted or non-substituted alkyl group, substituted or non-substituted alkenyl group and substituted or non-substituted aryl group. $R^2$ is more preferably selected from the group consisting of substituted alkyl group and substituted or non-substituted alkenyl group. The functional group is optionally selected from the same group as defined for $R^1$. Most preferably, $R^2$ is a non-substituted vinyl group.

Y is preferably selected from the group consisting of hydroxy group and C1-C4-alkoxy group, more preferably selected from the group consisting of hydroxy group, methoxy group and ethoxy group. This preference allows an improved coverage of the binding sites and the avoidance of potentially corrosive halides or hydrogen halides such as HCl.

m and n are integers. Preferably, m is selected from 1 and 2 giving rise to an improved coverage of the binding sites due to the two- or three-dimensional structure of the silicon compound. The at least one silicon compound is preferably free of trialkoxysilyl groups leading to less VOC emissions. Preferably, n is selected from 1 and 2 for the reasons laid out for the integer m.

Preferably, the at least one silicon compound comprises at least one reactive moiety per silicon atom wherein the reactive moiety is selected from the group consisting of hydroxy group, carboxylic acid group, chloride and alkoxy group. This is to be understood that the silicon compound comprises at least one reactive moiety per silicon atom on average. More preferably, at least one reactive moiety is bound to every silicon atom of the silicon compound. The reactive moiety is preferably selected from the group consisting of methoxy group, ethoxy group and hydroxy group for the reasons laid out for X and Y. This allows for an improved coverage of the binding sites compared to the prior art solutions.

Usually, the silicon compound comprises 1 to 100 building block according to formula (A). The at least one silicon compound preferably comprises 2 to 50, more preferably 3 to 30, even more preferably 4 to 20, building block according to formula (A).

Usually, the silicon compound comprises 1 to 100 building block according to formula (B). The at least one silicon compound preferably comprises 2 to 50, more preferably 3 to 30, even more preferably 4 to 20, building block according to formula (B).

The at least one silicon compound preferably comprises 2 to 100, more preferably 4 to 50, even more preferably 5 to 30, building blocks according to formula (A) and (B) in total.

The silicon compound is preferably free of hydrogen atoms bonded directly to silicon atoms to avoid the liberation of hydrogen upon treatment of the core of the surface-modified particle.

The silicon compound comprises at least one building block according to formula (A) and at least one building block according to formula (B). Said building blocks are preferably bound to each other by a joint oxygen atom present between the two silicon atoms of the individual building blocks. In case the silicon compound comprises more than one building block according to formula (A) and/or more than one building block according to formula (B), at least one bond as described hereinbefore is typically comprised by the silicon compound. A silicon compound comprising a building block according to formula (A) and a building block according to formula (B) can exemplarily be depicted as follows:

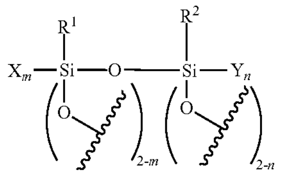

The silicon compound is generally commercially available or can be obtained by standard methods. For example, two or more suitable silanes can be reacted with each other in a (targeted) hydrolysis and condensation reaction. These reactions can be carried out in a suitable solvent (e.g. water, an alcohol such as methanol, ethanol, and propanol or a mixture of water and alcohol or a ketone such as methyl isobutyl ketone (MIBK)). Useful catalysts for this kind of reaction are known in the art and encompass inorganic and organic acids (e.g. hydrochloric acid, acetic acid), bases (e.g. ammonia or potassium hydroxide) and metal chelates (e.g. titanates or zirconates). If desired, the alcohols liberated during condensation can be removed by standard means such as distillation. A useful method is described in EP 0 675 128 (see page 2, line 50 to page 5, line 41 and in particular example II).

The at least one silane according to formula(S) comprises $R^s$ and $R^t$. Preferably, $R^s$ is preferably selected from the group consisting of hydroxy group and C1-C4-alkoxy group, more preferably selected from the group consisting of hydroxy group, methoxy group and ethoxy group. This preference allows an improved coverage of the binding sites and the avoidance of potentially corrosive halides or hydrogen halides such as HCl.

$R^t$ is selected from the group consisting of alkyl group and alkenyl group. Said alkyl group and said alkenyl group are non-substituted. $R^t$ is preferably a non-substituted C1-C18-alkyl group, more preferably a non-substituted C2-C8-alkyl group, even more preferably a non-substituted C2-C4-alkyl group, especially a n-propyl group.

At least one $R^s$ is selected from the group consisting of chloride, carboxylic acid group, hydroxy group and alkoxy group (applying the preferences described above).

The weight ratio of the at least one silane according to formula(S) to the at least one silicon compound (or the compounds derived from the aforementioned) in the layer ranges from 0.1 to 50, preferably from 0.2 to 20, more preferably from 1 to 10.

The weight of the layer on the surface of the core preferably ranges from 0.1 to 25 weight-%, more preferably from 0.5 to 15 weight-%, even more preferably 3 to 8 weight-%, based on the weight of the core of the surface-modified particle.

The means of treatment are described herein-below. The layer obtained from treating the core with the at least one silicon compound and the at least one silane according to formula(S) favorably does not alter the color of the particles or compositions comprising the surface-modified particle according to the invention. Also, this surface treatment will remove surface hydroxyl groups thus preventing the formation of hydrogen bonding. Such hydrogen bonding is undesired because of the tendency to form permanent aggregates during particle drying process.

The size of the surface-modified particle preferably ranges from 2 to 1000 nm, more preferably from to 5 to 500 nm, even more preferably from 70 to 200 nm. The size of the surface-modified particles can be measured using any suitable technique, preferably employing X-Ray laser diffraction technique. A suitable size measurement instrument and its use is described in the experimental section of this specification. It is of particular interest that above-defined size ranges apply to all dimensions of the surface-modified particles.

The shape of the surface-modified particle is not particularly limited. It may be irregularly shaped. It is preferably round-shaped, more preferably spherical.

The aspect ratio of the surface-modified particle preferably ranges from 1:1 to 5:1, more preferably from 1:1 to 3:1, even more preferably from 1:1 to 2:1. In an aspect ratio x:y, x denotes the largest dimension of the surface-modified particle and y its smallest dimension. The dimensions of the surface-modified particles may be measured in a 2-dimensional picture obtained by TEM. Usually, at least 100 surface-modified particles should be measured. It is preferred that at least 80%, more preferred at least 90%, even more preferred 99%, of the surface-modified particles have aforementioned aspect ratios. Surface-modified particles having aspect ratios in aforementioned ranges enjoy enhanced dispersibility and are particularly suitable for use in toner compositions. The inventors believe that this effect may be due to a favorable volume to surface ratio which provides a very high number of functional groups obtained from the at least one silicon compound and the at least one silane according to formula(S) present on the surface of the surface-modified particles. Further, the aforementioned aspect ratios advantageously influence the usability of the surface-modified particles for toner compositions.

The layer on the surface of the core obtained from treating said core with the at least one silicon compound and the at least one silane according to formula(S) proved difficult to characterize. Possibly, it comprises a mixture of compounds formed by reacting said silicon compound and silane according to formula(S) with one or more binding sites present on the surface of the core such as a hydroxyl group.

Generally, a layer in the context of the present invention is to be interpreted broadly. It is possible that the layer covers the entire surface of the core or one or more than one part thereof. For example, it may be a uniform layer on the surface of the core or it may be an island-like structure present on its surface or it could be a mere surficial functionalization of the core with the first-mentioned naturally being preferred. The layer on the surface of the core obtained from treating said core with the at least one silicon compound and the at least one silane according to formula(S) is preferably located directly on the surface of the core. The layer is preferably bound chemically to the surface of the core, e.g. by means of a reaction of a binding site such as a hydroxy group present on the surface of the core and a silanol group or the like of the silicon compound or the silane according to formula(S).

The surface-modified particle according to the invention can be used to impart hydrophobic (i.e. contact angle of 90° or higher) or even superhydrophobic (i.e. contact angle of 150° or higher) properties to surfaces treated therewith. Any surface can be used in this context. Preferable surfaces are selected from the group consisting of ceramics, fibers, metals, pigments and membranes.

The present invention is further directed at the use of the (at least one) surface-modified particle according to the invention as additive in toner compositions, adhesives or polishing slurries or as filler in electronic materials, (specialty) coatings or membranes. The present invention thus pertains to a composition comprising at least one surface-modified particle according to the invention. Usually, such composition comprises a plurality of said surface-modified particle. The amount thereof depends on various factors and the desired use of the composition.

The present invention further pertains to a method of preparing the surface-modified particle according to the invention comprising the method steps I) providing at least one non-modified particle; and II) treating the non-modified particle with II.I) at least one silicon compound comprising at least one building block according to formula (A):

(A)

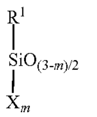

wherein $R^1$ is an organic radical, preferably selected from the group consisting of substituted or non-substituted alkyl group, substituted or non-substituted alkenyl group and substituted or non-substituted aryl group;

each X is independently selected from the group consisting of hydroxy group, carboxylic acid group, chloride and alkoxy group;

m is selected from 0, 1 and 2;

and at least one building block according to formula (B):

(B)

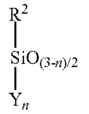

wherein $R^2$ is an organic radical, preferably selected from the group consisting of substituted or non-substituted alkyl group, substituted or non-substituted alkenyl group and substituted or non-substituted aryl group;

each Y is independently selected from the group consisting of hydroxy group, carboxylic acid group, chloride and alkoxy group;

n is selected from 0, 1 and 2;

and

II.ii) at least one silane according to formula(S):

(S)

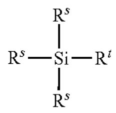

wherein each $R^s$ is independently selected from the group consisting of hydroxy group, carboxylic acid group, chloride, alkoxy group, alkyl group and aryl group; and $R^t$ is selected from the group consisting of alkyl group and alkenyl group; with the proviso that at least one $R^s$ is selected from the group consisting of chloride, carboxylic acid group, hydroxy group and alkoxy group.

By carrying out method steps I and II, the surface-modified particle according to the invention is obtained.

In method step I, the non-modified particle comprising the at least one oxidic material is provided. The non-modified particle corresponds to the core of the surface-modified particle according to the invention. To that end, the non-modified particle can be prepared by known means or a commercially available non-modified particle can be used. A useful method of making the non-modified particles is the so-called Stöber process (Werner Stöber, Arthur Fink, Ernst Bohn, Controlled growth of monodisperse silica spheres in the micron size range, Journal of Colloid and Interface Science, Vol. 26, pp. 62-69 (1968)). The non-modified particle preferably does not comprise a layer on its surface such as a layer obtained by treating said non-modified particle with a silane or siloxane to avoid undesired side-reactions during method step II. Optionally, the non-modified particle comprises another material than the oxidic material (vide supra). Details and preferences described for the core of the surface-modified particle according to the invention apply to the non-modified particle *mutatis mutandis*.

In method step II, the non-modified particle is treated with the at least one silicon compound and the at least one silane. Preferences regarding the silicon compound and the silane according to formula(S) have been described hereinbefore. Thereby, a layer is formed on the surface of the non-modified particle. The means of treatment are not particularly limited. To that end, the surface of the non-modified particles needs to come into contact with the at least one silicon compound and the at least one silane according to formula(S). It is possible within the context of the present invention to use solutions or dispersions comprising the non-modified particle and/or the at least one silicon compound and/or silane according to formula(S).

For example, a non-modified particle is dipped into the at least one silicon compound and the at least one silane according to formula(S) or a composition comprising said silicon compound and the at least one silane according to formula(S). Alternatively, the non-modified particle is provided (e.g. as a powder (preferably dried prior to method step II to remove attached water therefrom) or as dispersion) and the at least one silicon compound and the at least one silane according to formula(S) is added thereto, e.g. by spraying or by dripping it thereon or thereto. It is also possible to use non-modified particle and mix it directly with the at least one silicon compound and the at least one silane according to formula(S) using a suitable mixing device. Further and preferably, it is possible to provide a composition (such as a dispersion) comprising the non-modified particle followed by addition of the at least one silicon compound and the at least one silane according to formula (S) thereto and mixing the aforementioned.

The order of the treatment of the non-modified particle with the at least one silicon compound and the at least one silane according to formula(S) is not particularly limited. Preferably, the non-modified particle is treated with the silicon compound first and with the silane according to formula(S) thereafter. If more than one silicon compound are used in this context, all silicon compounds are employed before the first silane according to formula(S). If more than one silane according to formula(S) is used, all of said silanes are used after all silicon compound were employed. This allows for an even more improved coverage of the binding sites. Alternatively, the non-modified particle is treated with the silane first and with the silicon compound thereafter or the non-modified particle is treated with the silane according to formula(S) and the silicon compound simultaneously.

The at least one silane according to formula(S) is preferably added to the at least one non-modified particle at an addition rate ranging from 0.01 to 50 g per minute and per 1 kg of non-modified particles. This further improves the coverage of the binding sites of the formed surface-modified particles. Preferably, the addition rate ranges from 0.1 to 30 and most preferably from 1 to 10 g per minute and per 1 kg of non-modified particles.

The amount of the at least one silicon compound and the at least one silane according to formula(S) is preferably selected to meet above-described layer weight ranges. Typically, the amount of the at least one silicon compound used in method step II ranges from 0.1 to 10 weight-%, preferably from 0.25 to 8 weight-%, more preferably from 0.5 to 4 weight-%, based on the overall mass of the at least one non-modified particle.

It is preferred that the weight ratio of the at least one silane according to formula(S) to the at least one silicon compound in method step II ranges from 0.1 to 50, preferably from 0.2 to 20, more preferably from 1 to 10.

The temperature during method step II preferably ranges from 5 to 130 °C, preferably from 20 to 90 °C, more preferably from 50 to 80 °C. The duration of method step II preferably ranges from 1 to 24 h, preferably from 2 to 18 h, more preferably from 6 to 13 h.

Depending on the means of treatment in method step II further optional method steps are optionally added to the method according to the invention. For example, it is possible to disperse the obtained surface-modified particles according to the invention or to dilute a dispersion or to increase the concentration thereof, e.g. by removing superfluous solvent using standard means such as distillation. Optionally, the surface-modified particles are dried before and/or after method step II. This can be accomplished by standard means such as using ovens.

Optionally, the method of preparing the surface-modified particle according to the invention comprises a further method step III:

III) milling the surface-modified particle.

This step advantageously reduces the number of secondary particles (so-called aggregates) resulting in smaller particles. Preferable tools to be used for this purpose are ball mills or jet mills. It is preferred that the surface-modified particles are dried before method step III.

The inventive method allows for a facile manufacturing process of the surface-modified particle according to the invention. The inventive method further reduces the liberation of VOCs and toxic compounds such as methanol compared to standard methods using silanes. Using the at least one silicon compound and the at least one silane according to formula(S) also results in a uniform distribution of the obtained layer on the surface of the core of the surface-modified particles. The use of the silicon compound and the at least one silane according to formula(S) also gives an improved coverage of binding sites (such as hydroxy groups) present on the surface of the non-modified particle compared to other methods, e.g. when employing silanes or hydrosiloxanes or silicon compounds alone. Due to the latter, less material is required compared to prior art solutions giving ecological and economic advantages. Furthermore, aggregation of particles is reduced.

The present invention in addition concerns a toner composition comprising at least one surface-modified particle according to the invention. Generally, toner compositions and the components used therein are known in the art. The toner composition according to the invention can be obtained by mixing colored particles and the at least one surface-modified particle, preferably as powder, by means of a stirrer such as Henschel mixer. The toner according to the invention has a higher moisture resistance, a more brilliant print and an increased printing efficiency.

Colored particles typically comprise at least one binder resin and at least one coloring agent. The method for producing them is subject to no special limitation, but they are exemplarily produced, for example, in a pulverizing process (a process in which a coloring agent is molten into a thermoplastic resin as binder resin component and mixed for uniform dispersion to form a composition, which is then pulverized and classified to obtain the colored particles) or in a polymerization process (a process in which a coloring agent is molten or dispersed into a polymerizable monomer as raw material for the binder resin and then suspended in a water-based dispersion medium containing a dispersion stabilizer after addition of a polymerization initiator and the suspension is heated up to a predefined temperature to initiate polymerization to obtain the colored particles by filtration, rinsing, dewatering and drying after completed polymerization).

The at least one binder resin includes resins which have widely been used for some time for toners. The at least one binder resin is preferably selected from the group consisting of polymers of styrene and its substitution products such as polystyrene, poly-p-chlorostyrene and polyvinyl toluene, styrene copolymers such as styrene-p-chlorostyrene, styrene-propylene, styrene-vinyltoluene, styrene-vinylnaphthalene, styrene-methyl acrylate, styrene-ethyl acrylate, styrene-butyl acrylate, styrene-octyl acrylate, styrene-methyl methacrylate, styrene-ethyl methacrylate, styrene-butyl methacrylate, styrene-alpha-methyl chloromethacrylate, styrene-acrylonitrile, styrene-vinylmethylether, styrene-vinylethylether, styrene-vinylmethylketone, styrene-butadiene, styrene-isoprene, styrene-acrylonitrile-indene, styrene-maleic acid and styrene-maleate, polymethyl methacrylate, polyvinyl chloride, polyvinyl acetate, polyethylene, polypropylene, polyester, polyurethane, polyamide, epoxy resins, polyvinyl butyral, polyacrylic resins, rosin, modified rosin, terpene resins, phenol resins, aliphatic resins or alicyclic hydrocarbon resins and aromatic petroleum resins and mixtures of the aforementioned. Publicly known mold release agent, antistatic agent, etc. are optionally added to the said at least one binder resin.

Every pigment and/or dye including carbon black and titanium white can be used as the coloring agent contained in the colored particles. The colored optionally contains at least one magnetic material. Said at least one magnetic material is preferably selected from the group consisting of iron oxides such as magnetite, gamma-iron-oxide, ferrite and iron-excessive ferrite, metals such as iron, cobalt and nickel or alloys and their mixtures of the said metals with such metals as aluminum, copper, magnesium, tin, zinc, calcium, titanium, tungsten and vanadium.

Every toner composition according to the present invention can be used as it is, namely as a one-component toner. It can also be mixed with a carrier for use as a so-called two-component toner.

The present invention is further directed at a surface-modified particle obtained by the method according to the invention.

The present invention aims at a method for treating a surface of a substrate comprising the method steps B1) providing the substrate having the surface; and B2) treating the surface of the substrate with at least one surface-modified particle according to the invention.

By carrying out method steps B1 and B2, a substrate having a treated surface is obtained. As described hereinbefore, the treatment with at least one surface-modified particle according to the invention (usually a plurality thereof is used) imparts certain functionalities to the surface, e.g. hydrophobicity. The choice of substrates is not particularly limited and the person skilled in the art can select an appropriate substrate in accordance with the technical requirements he desires to meet. Preferable substrates are selected from the group consisting of glass, pigments, fibers, flakes, ceramics, and cellulosic materials such as in particular paper and card-board. The thus treated surface exemplarily enjoys improved moisture resistance, enhanced mechanical or thermal stability.

The treatment in method step B2 is not particularly limited. Many methods can be used such as dipping the substrate into a composition comprising the at least one surface-modified particle according to the invention, said composition may be sprayed, printed or painted onto the surface of the substrate and so forth. The person skilled in the art can select suitable temperatures and durations based on routine experiments.

Moreover, the present invention is also directed at a substrate comprising at least one layer comprising at least one surface-modified particle according to the invention.

The invention will now be illustrated by reference to the following non-limiting examples.

EXAMPLES

Dynasylan 6598 (a co-oligomer of n-propyltriethoxysilane and vinyltriethoxysilane, provided by Evonik Corp., USA) was used as the silicon compound in the examples.

Preparation of Non-Modified Particles

Example 1 (According to the Invention)

a) Synthesis of 200 nm Silica Particles (Corresponds to Method Step I):

In a 1 L reactor, 10.1 g of potassium hydroxide (45 weight-% in water), 141.4 g of ethanol and 518.9 g of water was charged. The solution was vigorously mixed and heated to 78 °C. 329.6 g of TEOS (tetraethoxysilane) was added over a period of 3 hours for synthesizing silica nanoparticles. After the reaction, the suspension comprising the non-modified particles was cooled to room temperature (20 °C).

b) Functionalization (Corresponds to Method Step II):

In the same reactor, 3% (w/v) of Dynasylan 6598 was slowly added to the silica suspension at room temperature. The silicon compound was dropped to the suspension over a period of 1 hour. After addition, the temperature was increased to 78 °C. The functionalization reaction was carried for 4 hours. Next, 0.5% (w/v) of n-propyltriethoxysilane (PTEO, provided by Evonik Corp.) was added slowly at the suspension at 50 °C. The reaction was continued for 3 hours after which the suspension comprising the surface-modified particles was cooled to room temperature.

c) Drying and Milling (Corresponds to Optional Method Step III):

Subsequently, the surface-modified particles were obtained by centrifuging, washing with ethanol and drying at 50 °C. The dried powder samples of the surface-modified particles were milled by a ball mill at 300 RPM (15 to 30 min).

Example 2 (Comparative)

The silica particles were synthesized as described in example 1. Following that, the silica particles were functionalized with 3% (w/v) of Dynasylan 6598 only using the procedure mentioned in example 1.

Example 3 (Comparative)

The silica particles were synthesized as described in example 1. Following that, the silica particles were functionalized with 4% (w/v) n-propyltriethoxysilane using the procedure mentioned in example 1.

The resulting products were characterized by the following methods:

Dispersibility Test

The powder samples of Examples 1 to 3 were mixed with different solvents in a ratio of 1:5 by weight (20 °C). The suspensions were mixed by a sonicator for 30 minutes and the state of dispersibility was visually observed. The results are shown in the subsequent table.

TABLE 1

Dispersibility tests of samples for different solvents.

| | Particles obtained from Example | | |
|---|---|---|---|
| Organic solvent | 1 (inventive) | 2 (comparative) | 3 (comparative) |
| acetonitrile | ○ | X | X |
| ethanol | ○ | ○ | X |
| 2-propanol | | | |
| MEK | ○ | X | X |
| MIBK | ○ | ○ | X |

MEK: methyl ethyl ketone;
MIBK: methyl isobutyl ketone;
X: wetted, but not fully dispersed (residue in the bottom of vial);
○: fully dispersed Example 1 (in accordance with the present invention) gave stable dispersions with all organic solvents tested while the particles modified with monomeric silanes or with silicon compounds alone were not fully dispersible. From the results shown above, it can be concluded that the dispersibility of surface-modified particles according to the invention in organic solvents is better than the dispersibility of particles known from the prior art such as those treated with monomeric silanes (Example 3) or of those treated with silicon compounds alone (Example 2).

Laser Diffraction Particle Size Distribution

The particle size distribution of dispersions comprising the surface-modified particles of example 1 and non-modified particles in ethanol was measured by laser diffraction scattering type particle distribution analyzer (LA 950, Horiba). The dispersions were sonicated for 5 minutes before measuring. The peak for example 1 was narrower and fractions of particles greater than 1 μm were much smaller compared to the non-modified particles. This indicates an improved wettability and solubility of the surface-modified particles according to the invention. Also, this confirms that less agglomerates were formed during drying for surface-modified particles according to the invention compared to non-modified particles.

Figure 1B:
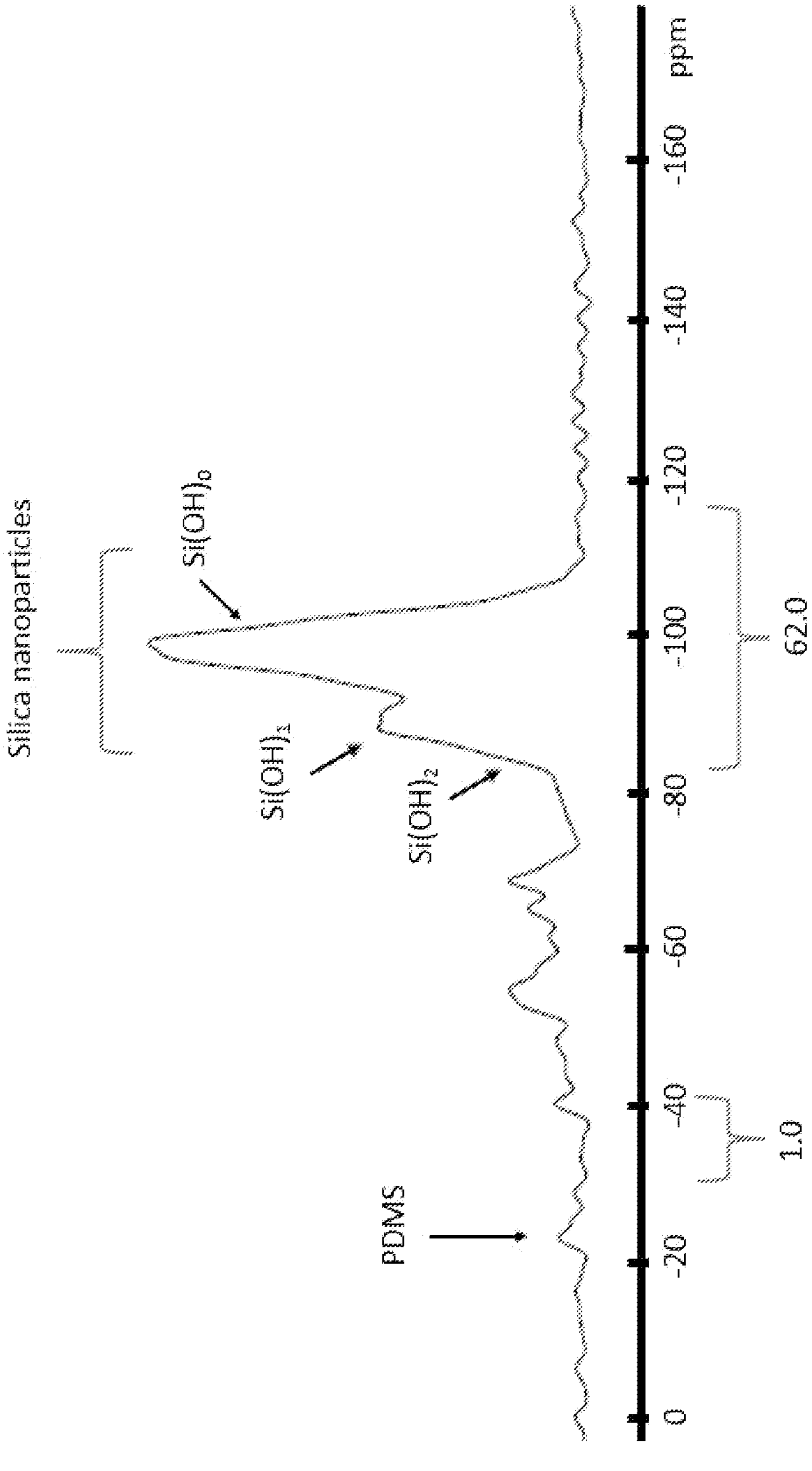

Solid State $^{29}$Si NMR (FIG. 1)

Solid state $^{29}$Si NMR was measured on a Bruker Avance III 300 FT-NMR spectrometer. 1 weight-% Polydimethylsiloxane (PDMS) was each added to the powder sample of example 1 and 2 as an internal standard (reference is made to US 2010/0071272, in particular to the figures and paragraphs 70 et seqq.). The area of PDMS peak and the total area of silanol peaks in the spectra were normalized based on the PDMS peak area. The ratio of the normalized PDMS and total silanol peak area provides an estimate about the remaining silanol groups after functionalization experiment. A higher molar ratio of PDMS to silanol groups indicates incomplete surface coating by organosilane. The results are shown in the following table.

TABLE 2

The molar ratio of PDMS to total silanols in silica samples evaluated by solid state $^{29}$Si NMR.

| Example | PDMS:silanols |
|---|---|
| 1 | 64.5 |
| 2 | 80.3 |
| 3 | 105.5 |

It is obvious that the number of binding sites of the surface-modified particles according to the invention is significantly lower compared to those of the prior art having been made with monomeric silanes or with silicon compounds alone. The inventive method thus allows for an improved coverage of the binding sites.

Methanol Wettability Test

The purpose of this test was to gauge hydrophobicity of the treated sample. The weight-% of methanol-water mixture that completely wets the sample is a measure of the degree of hydrophobicity and uniformity of treatment.

0.2 g of surface-modified particles were placed in each 15 mL transparent conical centrifuge tubes (with markings for the first 1 mL). Methanol-water mixtures of concentrations varying from 30 to 70 weight-% were prepared. Into each tube, 8 mL of methanol-water mixture of a particular concentration was added. The contents were vigorously mixed and then centrifuged for 5 min at 2500 RPM. Following that, the level of sediment was visually analyzed. The results are shown in the following table.

TABLE 3

Methanol Wettability results.

| Example | Methanol Wettability |
|---|---|
| 1 (inventive) | 60 weight-% |
| 2 (comparative) | 30 weight-% |
| 3(comparative) | 30 weight-% |

The inventive example 1 showed the most hydrophobic surface-modified particles.

Other embodiments of the present invention will be apparent to those skilled in the art from a consideration of this specification or practice of the invention disclosed herein. It is intended that the specification and examples be considered as exemplary only, with the true scope of the invention being defined by the following description.

The invention claimed is:

1. A surface-modified particle for use in a toner composition, comprising:

a) a core comprising at least one oxidic material selected from the group consisting of silicon oxide, metal oxide and mixtures of one or more of the aforementioned; and b) at least one layer obtained from b.i) at least one silicon compound comprising at least one building block according to formula (A):

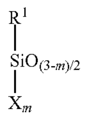

(A)

wherein $R^1$ is an organic radical;

each X is independently selected from the group consisting of hydroxy group, carboxylic acid group, chloride and alkoxy group;

m is selected from 0, 1 and 2;

and at least one building block according to formula (B):

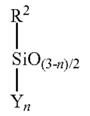

(B)

wherein $R^2$ is an organic radical;

each Y is independently selected from the group consisting of hydroxy group, carboxylic acid group, chloride and alkoxy group;

n is selected from 0, 1 and 2;

and b.ii) at least one silane according to formula(S):

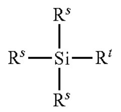

(S)

wherein each $R^s$ is independently selected from the group consisting of hydroxy group, carboxylic acid group, chloride, alkoxy group, alkyl group and aryl group; and $R^t$ is selected from the group consisting of alkyl group and alkenyl group;

with the proviso that at least one $R^s$ is selected from the group consisting of chloride, carboxylic acid group, hydroxy group and alkoxy group.

2. The surface-modified particle according to claim 1, wherein a size of the surface-modified particle ranges from 2 to 1000 nm.

3. The surface-modified particle according to claim 2, wherein the size of the surface-modified particle ranges from 5 to 500 nm.

4. The surface-modified particle according to claim 3, wherein the size of the surface-modified particle ranges from 70 to 200 nm.

5. The surface-modified particle according to claim 1, wherein the at least one silicon compound comprises at least one reactive moiety per silicon atom wherein the reactive moiety is selected from the group consisting of hydroxy group, carboxylic acid group, chloride and alkoxy group.

6. The surface-modified particle according to claim 1, wherein $R^t$ is a non-substituted $C_1$-$C_{18}$-alkyl group.

7. The surface-modified particle according to claim 6, wherein $R^t$ is a non-substituted $C_2$-$C_4$-alkyl group.

8. The surface-modified particle according to claim 7, wherein $R^t$ is an n-propyl group.

9. The surface-modified particle according to claim 1 wherein a weight ratio of the at least one silane according to formula(S) to the at least one silicon compound in the layer ranges from 0.1 to 50.

10. The surface-modified particle according to claim 1, wherein a weight of the layer on a surface of the core ranges from 0.1 to 25 weight-% based on a weight of the core of the surface-modified particle.

11. The surface-modified particle according to claim 1, wherein the layer is obtained by treating a non-modified particle with the at least one silicon compound first and with the at least one silane according to formula(S) thereafter.

12. The surface-modified particle according to claim 1, wherein an aspect ratio of the surface-modified particle ranges from 1:1 to 5:1.

13. A method of preparing the surface-modified particle according to claim 1, comprising:

I) providing at least one non-modified particle; and

II) treating the non-modified particle with

II.1) at least one silicon compound comprising at least one building block according to formula (A);

and at least one building block according to formula (B);

and

II.ii) at least one silane according to formula(S).

14. The method according to claim 13, wherein the non-modified particle is treated with the at least one silicon compound first and with the at least one silane according to formula(S) thereafter.

15. The method according to claim 13, wherein the at least one silane according to formula(S) is added to the at least one non-modified particle at an addition rate ranging from 0.01 to 50 g per minute and per 1 kg of non-modified particles.

16. A surface-modified particle obtained by the method according to claim 13.

17. A method, comprising:

adding the at least one surface-modified particle according to claim 1 as an additive in toner compositions, adhesives or polishing slurries or as a filler in electronic materials, (specialty) coatings or membranes.

18. A toner composition, comprising:

at least one surface-modified particle according to claim 1.

19. A method for treating a surface of a substrate, comprising:

B1) providing the substrate having the surface; and

B2) treating the surface of the substrate with at least one surface-modified particle according to claim 1.

20. A substrate, comprising:

at least one layer comprising at least one surface-modified particle according to claim 1.

* * * * *